(12) United States Patent
Bruso et al.

(10) Patent No.: US 7,707,219 B1
(45) Date of Patent: Apr. 27, 2010

(54) SYSTEM AND METHOD FOR TRANSFORMING A DATABASE STATE

(75) Inventors: Kelsey L. Bruso, Minneapolis, MN (US); James M. Plasek, Shoreview, MN (US); William J. Reichow, White Bear Lake, MN (US)

(73) Assignee: Unisys Corporation, Blue Bell, PA (US)

( * ) Notice: Subject to any disclaimer, the term of this patent is extended or adjusted under 35 U.S.C. 154(b) by 645 days.

(21) Appl. No.: 11/140,820

(22) Filed: May 31, 2005

(51) Int. Cl.
*G06F 17/30* (2006.01)
*G06F 17/00* (2006.01)

(52) U.S. Cl. .................. 707/758; 707/705; 707/687; 707/802

(58) Field of Classification Search .............. 707/200, 707/201, 202, 203, 204, 205; 709/249
See application file for complete search history.

(56) References Cited

U.S. PATENT DOCUMENTS

| | | | | |
|---|---|---|---|---|
| 6,141,664 | A * | 10/2000 | Boothby | 707/201 |
| 6,256,773 | B1 * | 7/2001 | Bowman-Amuah | 717/121 |
| 6,453,325 | B1 * | 9/2002 | Cabrera et al. | 707/204 |
| 6,532,480 | B1 * | 3/2003 | Boothby | 707/201 |
| 6,539,396 | B1 * | 3/2003 | Bowman-Amuah | 707/103 R |
| 6,725,242 | B2 * | 4/2004 | Gardner | 707/203 |
| 6,795,868 | B1 * | 9/2004 | Dingman et al. | 709/246 |
| 7,013,315 | B1 * | 3/2006 | Boothby | 707/203 |
| 2005/0049996 | A1 * | 3/2005 | Srinivasan et al. | 707/1 |
| 2005/0050083 | A1 * | 3/2005 | Jin et al. | 707/102 |
| 2005/0080765 | A1 * | 4/2005 | Dettinger et al. | 707/3 |

* cited by examiner

*Primary Examiner*—Pierre M Vital
*Assistant Examiner*—Loan T Nguyen
(74) *Attorney, Agent, or Firm*—Richard J. Gregson; Crawford Maunu PC

(57) ABSTRACT

A system and method for managing a database is provided. The system and method includes logic that supports an atomic synchronization operation initiated by execution of a single synchronization statement. This operation utilizes a single call to a database management system to transform a database table from a first unknown state to a known state that contains a specified target record containing one or more specified data values. The first unknown state may be a state that already contains the target record, or may instead be a state that does not contain the record. In the former instance, a record containing one or more of the data values is created, and in the latter instance, the existing record is updated. A one-step locking mechanism is performed in conjunction with the operation to prevent the occurrence of deadlock and to minimize the number of required lock requests.

12 Claims, 10 Drawing Sheets

| Synchronization Action | Indicator Value | | |
|---|---|---|---|
| | -1 | 0 | 1 |
| Create a Record | "Null" | Insert Data | Insert Data |
| Modify an Existing Record | "Null" | Insert Data | Retain Existing Data |

*Figure 3*

SYSTEM AND METHOD FOR TRANSFORMING A DATABASE STATE

FIELD OF THE INVENTION

This invention relates to a system and method for constructing and managing a database table; and, more specifically, relates to a mechanism for providing a single operation that performs an insert or an update database transformation.

BACKGROUND OF THE INVENTION

Computers are used today to store large amounts of data. Such information is often stored in information storage and retrieval systems referred to as databases. This information is stored to, and retrieved from, a database using an interface known as a database management system (DBMS).

One type of DBMS is called a Relational Database Management System (RDBMS). An RDBMS employs relational techniques to store and retrieve data.

Relational databases are organized into tables, wherein tables include both rows and columns, as is known in the art. Each row of a table may be referred to as a record. Each column defines a respective data item, or data value, that may be saved within each of the records. For example, a "business name" column may store data that identifies a business name that is associated with the record. The remaining columns may store additional data for the business identified within the business name column.

Many DBMS systems support the concept of a "transaction", which is a single logical operation that accomplishes an indivisible action on the data within the database. Such DBMS systems enforce the transaction properties of Atomicity, Consistency, Isolation, and Durability, also referred to as the "ACID" properties. The following definitions for these terms are provided in Transaction Processing: Concepts and Techniques, by Jim Gray and Andreas Reuter, Morgan Kaufmann Publishers, Inc., 1993, p. 6:

Atomicity. A transaction's changes to the state are atomic; either all happen or none happen. These changes include database changes, messages, and actions on transducers.

Consistency. A transaction is a correct transformation of the state. The actions, taken as a group, do not violate any of the integrity constraints associated with the state. This requires that the transaction be a correct program.

Isolation. Even though transactions execute concurrently, it appears to each transaction, T, that other transactions execute either before T or after T, but not both.

Durability. Once a transaction completes successfully, (commits), the state of the data is changed to reflect the successful completion of the transaction, and the state of the data will survive system failures.

DBMS systems that enforce the ACID properties generally use a command language to transform a database from one state to a next. As an example, all DBMS systems that enforce ACID properties include a command to create a new entry within the database. This type of command, sometimes referred to as an INSERT statement, adds a new record to the database. Another similar type of command, sometimes referred to as an UPDATE, is used to modify a record that already exists. This type of command locates an existing record of interest within the database, and then modifies the contents of one or more of the record columns.

The types of commands described above may only be issued after a current state of the database has been ascertained. In other words, an entity such as an application program must determine whether the target record exists before that program will know which command to issue. This is necessary because if an INSERT statement is issued to add a target record to the database when that record already exists, an error will occur. Similarly, an error will occur if an UPDATE statement is used to modify a non-existing record.

In view of the foregoing, application programs generally perform a query to determine the state of a database table before an INSERT or UPDATE statement is issued. This may be accomplished by issuing a SELECT statement, (sometimes referred to as a "Singleton SELECT") to see if a target record already exists. If a record is returned in response to execution of this statement, an UPDATE may be performed. Otherwise, an INSERT operation is executed. Other similar types of database operations may be used to determine the state of the database prior to issuing an INSERT or UPDATE statement.

Several limitations exist with the above-described mechanism. First, it requires the execution of several statements. An initial statement must be issued to obtain the database state. Next, decisional logic is required to test that state. Thereafter, logic is required to handle each of the two possible outcomes of the test operation, with one outcome involving issuance of the INSERT statement, and the other resulting in execution of the UPDATE statement. This logic sequence, which may be required in a large number of places throughout the software, adds complexity to the system, and may be difficult and time-consuming to test.

Another limitation associated with the foregoing approach is that it requires the database to be accessed twice. An initial database access is necessary to obtain the state of the database, and a subsequent access is needed to execute the UPDATE or INSERT statement. This adversely impacts system performance.

Still another problem involves the fact that there is no guarantee that the decisional logic will result in issuance of the correct statement. This is because a lock is not maintained on the database between the time the database state is obtained and the time the UPDATE or INSERT statement is issued. It is therefore possible for a different transaction (that is, a different, unrelated request issued to the database) to change the database state by executing an insert, update, or delete statement in association with a record of interest. This may result in the issuance of the wrong statement and the subsequent receipt of an error or some other condition returned by the DBMS that requires the calling program to handle via the execution of additional code. For example, if an attempt is made to update a record that does not exist, a "NO DATA" exception may be returned by DBMS to the calling program, indicating that the record was not located.

The problems discussed above are exacerbated by the fact that a class of application programs exists that does not recognize the distinction between an INSERT and UPDATE statement. This application class attempts to modify a database to a new state that includes a record containing specified data. These types of operations, which are performed without regard to whether that record previously existed within the database, frequently result in the receipt of errors. These errors are then handled by the error handling mechanisms of the DBMS. The invocation of the error handling procedures slows system throughput.

Another type of functionality that manifests problems similar to those discussed above involves MERGE-type operations. Whereas the INSERT and UPDATE statements are used to insert or update a single row of a table, respectively, a MERGE-type operation uses decisional logic to determine whether to merge a row from a first table into the row of a second table. An example of this type of operation is the MERGE statement supported by databases commercially available from the Oracle Corporation. As is the case with the INSERT and UPDATE statements, a user employing a MERGE statement is required to provide code for both a test condition, and code for each of the two alternative paths that may be taken following the test condition. As described above, this increases the complexity of the application, and makes testing more time-consuming and difficult.

The above-described problems have not been addressed because of the difficulty associated with providing a generic approach that is able to change a database from any one of multiple possible states to a second known state. This can best be understood by re-considering the distinctions between the INSERT and UPDATE statements. When an INSERT statement is executed, data is provided for each of the columns of the database, since each column will be "empty" at the time of record creation. In contrast, when an UPDATE statement is executed, it is generally desirable to provide data for only the selected columns that are to be modified, leaving the remaining columns unchanged. Without prior knowledge as to the database state, it cannot be determined which of these approaches should be used, and no generic solution has been devised that can equally apply to either type of situation.

Yet another related problem associated with transforming a database from a first unknown state to a second known state involves the prior art locking mechanisms that are associated with data retrieval in a DBMS. Generally, when a data retrieval operation such as a SELECT is initiated to read a record, a READ lock is activated on that record. This READ lock allows the transaction to read from, but not update, the record. After the SELECT is completed, that READ lock is deactivated.

As noted above, a SELECT is often performed to attempt to read the contents of a record. Thereafter, some decisional logic is executed to determine whether to issue an UPDATE or an INSERT statement for the record. Before the UPDATE or INSERT statement can actually be executed, however, a WRITE lock must be requested and obtained for the target record. This will allow the transaction that obtained the lock to both read from, and write to, that record. However, it is possible that between the time the SELECT was issued and the WRITE lock is requested, some other transaction was able to acquire a WRITE lock on the same target record, preventing the original transaction from continuing execution. When execution does resume on that transaction, the SELECT operation must be re-executed, since the contents (and even the very existence) of the record can no longer be assumed. This is a time-consuming process.

What is needed, therefore, is an improved system and method for addressing the foregoing problems associated with transitioning a database from a first unknown state to a second state.

SUMMARY OF THE INVENTION

The current invention provides an improved system and method for managing a database, and in particular a database table. In one embodiment, the described system and method provides a synchronization operation that transforms a database table from a first unknown state to a known state. The known state contains a specified target record that stores one or more specified data values (column values). The first unknown state may be a state that already contains the target record, or may instead be a state that does not contain the record. In the former instance, a record containing one or more of the data values is created, and in the latter instance, the existing record is updated.

The synchronization operation is invoked using a single database statement. Within the context of the invention, a statement is defined as a single call to the database management system to invoke an atomic operation on the data stored within the database, and that returns a response to the calling program. As previously discussed, an atomic operation is one wherein either all changes to the database are made, or none of the changes are made.

The current invention provides an improvement over prior art systems which can only accomplish transition from an unknown state to a known state via execution of multiple operations such as a retrieval-type operation to ascertain the state of the database, followed by an update or an insert operation to change the database state. The prior art mechanism slows throughput, especially when a second transaction changes the state of the database after a first transaction ascertains the database state, but before that first transaction has an opportunity to modify the state. This unexpected intervening state change may cause the first transaction to experience a fault such that processing-intensive fault handling is required, slowing throughput.

According to another aspect of the invention, in one embodiment, the synchronization operation is initiated by a synchronization statement requiring that the user only provide a primary key value of the target record, the table name, and any data that may be used to update or create that record. Use of the synchronize statement does not require the user to code any decisional logic as may be needed to ascertain the state of a database, nor does it require use of multiple logic sequences to handle the various possible scenarios that result from testing performed by the decisional logic. In contrast, a prior art coding sequence requires use of a first retrieval-type operation, followed by decisional logic to determine the database state. This decisional logic must be accompanied by at least two coding sequences, each to handle a respective one of the at least two possible states that may be detected by the decisional logic. Thus, it may be appreciated that a code sequence that initiates a synchronization operation is shorter, far less complicated, and easier to verify than its prior art counterpart.

Another aspect of the invention provides for the use of indicator values. An indicator value is a value that is respectively associated with a column of a database. This value, along with the current database state, determines whether a particular data value provided with the synchronize statement will be stored within the column of the database. This can be illustrated by example.

As stated above, when a synchronize statement is initiated, the state of the database is not known. Therefore, it is not known whether the target record exists or must instead be newly created. If the target record must be created, it is generally desirable to provide a data value for each column in that record. On the other hand, if the record does exist, it may be desirable to ignore some of the data values so that the existing contents of the corresponding columns remain unchanged. Therefore, an indicator value is defined that specifies that a data value provided with the synchronize statement will be ignored if the target record exists, but will instead be stored within a corresponding column if the record must be created. Another indicator value may be defined to indicate that a default value will be stored within a corresponding column.

In one embodiment, the synchronize statement employs a one-step locking mechanism that is designed to prevent the occurrence of deadlock scenarios. This locking mechanism includes a WRITE lock that is activated prior to the time it is determined whether a target record exists. This WRITE lock is maintained until changes to the database state are stored to persistent storage. This is an improvement over prior art systems that utilize a two-part locking sequence that first activates a READ lock to perform the operation that determines the database state, and then sometime later activates a WRITE lock prior to performing the operation that modifies the database state. The prior art mechanism results in a situation wherein two threads may have activated a READ lock on a same record, and thereafter both request activation of a WRITE lock, causing a deadlock situation that is time-consuming to handle.

The current invention further provides a data retrieval capability to return the contents of one or more record columns to the user, regardless of the number of columns that were updated. In one embodiment, if all indicator values have a predetermined value, all columns of the target record are retrieved for return to the user. This aspect of the invention provides a mechanism wherein retrieval can occur under the protection of an already-acquired WRITE lock, since a WRITE lock sequence is initiated for the synchronization operation. Since this WRITE lock is not relinquished until a subsequent commit operation is performed, the thread that initiates the synchronization operation is guaranteed to have update-access to the target record until a commit statement is executed. In contrast, prior art retrieval-type functions utilize READ locks only, thereby allowing for the possibility that a subsequent request for a WRITE lock to perform an update will result in a deadlock situation for the reasons discussed above. This will slow throughput in the prior art systems.

According to one embodiment, an automated method of managing a database is disclosed. The method includes providing one or more data values for inclusion in an identified target record, and invoking a single call to a database management system to transform the database from a first unknown state to a second state that includes the target record which is storing at least one of the one or more data values.

In another embodiment, a data processing system is provided. The system includes a database to store tables containing records, and a database management system coupled to the database that includes synchronization logic to execute a single statement which places an identified one of the tables in a selected state. The selected state, which includes an identified record storing one or more data values, is obtained irrespective of whether the identified record existed prior to execution of the single statement.

Yet another embodiment involves a computer readable medium storing a program to cause a device to perform a method. The method includes receiving a request specifying a database table, a record, and one or more data values, and executing a single call to a database management system that causes the database table to transition from an unknown initial state to a known state that includes the record storing at least one of the data values.

Other scopes and aspects of the invention will be apparent to those skilled in the art from the following description and the accompanying drawings.

BRIEF DESCRIPTION OF THE DRAWINGS

FIG. 3 is a table that summarizes the manner in which indicator variables are used in one embodiment of the invention.

DETAILED DESCRIPTION OF THE DRAWINGS

The following description provides exemplary embodiments of the current invention, which is a system and method that provides a single statement for transforming a database from a first unknown state to a second known state. In particular, a mechanism is provided to either insert or update a database record without regard to whether that record already exists within the database. In one embodiment, this invention provides an improved locking mechanism that increases efficiency, and that may be used to retrieve data in a way that will ensure that the transaction that retrieves the data will be not stalled if a subsequent write operation is required.

I. Example System Utilizing the Current Invention

Figure 1:
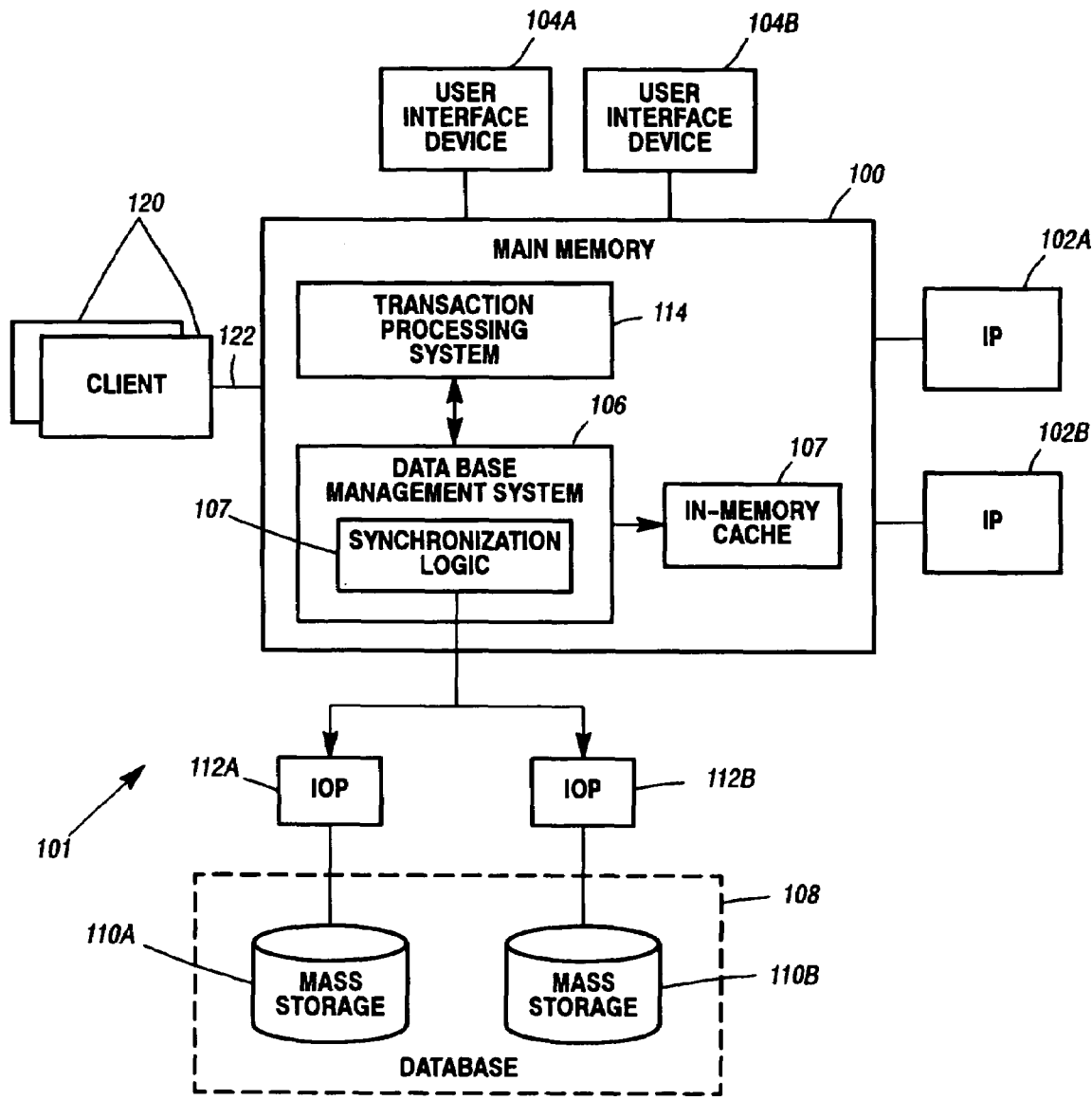
FIG. 1 is a block diagram of an exemplary data processing system 101 that may usefully employ the current invention.

FIG. 1 is a block diagram of an exemplary data processing system 101 that may usefully employ the current invention. The data processing system may be a personal computer, a workstation, a legacy-type system, or any other type of data processing system known in the art. The system includes a main memory 100 that is interactively coupled to one or more Instruction Processors (IPs) 102a and 102b. The memory may also be directly or indirectly coupled to one or more user interface devices 104a and 104b, which may include dumb terminals, personal computers, workstations, sound or touch activated devices, cursor control devices such as mice, printers, or any other known devices used to provide data to, or receive data from, the data processing system.

A DataBase Management System (DBMS) 106, which may be any DBMS known in the art, resides within main memory 100. This DBMS manages and provides access to a database 108 (shown dashed). In accordance with the current invention, DBMS includes synchronization logic 107 to synchronize the database from a first unknown state to a second state that includes a specified target record storing one or more specified data values. This will be discussed further below.

Database 108 may be stored on one or more mass storage devices 110a and 110b. Mass storage devices may be hard disks or any other suitable type of non-volatile or semi non-volatile device. These mass storage devices may be configured as a Redundant Array of Independent Disks (RAID). As known in the art, this configuration provides a mechanism for storing multiple copies of the same data redundantly on multiple hard disks to improve efficient retrieval of the data, and to increase fault tolerance. Battery back up may be provided, if desired. The transfer of data between mass storage devices and DBMS is performed by Input/Output Processors (IOPs) 112a and 112b.

Database 108 of one embodiment is a relational database that is organized into tables including both rows and columns, as is known in the art. Each row of a table may be referred to as a record. Rows of a table are generally stored within a logical container referred to as a file. Files reside on a persistent storage media such as mass storage devices 110A and 110B, and may contain all of the records of one or more tables. In the art, a file may be divided into equal sized portions called pages containing one or more records. The database structure will be discussed further below.

A transaction processing system 114 may be coupled to DBMS 106. This transaction processing system receives queries for data stored within database 108 from one or more users. Transaction processing system formats these queries, and then passes them to DBMS 106 for processing. DBMS 106 processes the queries by retrieving data records from, and storing data records to, database 108.

The system of FIG. 1 may further support a client/server environment. In this case, one or more clients 120 are coupled to data processing system 101 via a network 122, which may be the Internet, an intranet, a local area network (LAN), wide area network (WAN), or any other type of network known in the art. Some, or all, of the one or more clients 120 may be located remotely from the data processing system.

According to the current embodiment, DBMS 106 adheres to the properties of Atomicity, Consistency, Isolation, and Durability (ACID). Atomicity refers to the fact that when a transaction occurs to a database, either all changes associated with that transaction are completed, or none of the changes are completed. Consistency involves the notion that the updates performed during a database transaction, when taken as a group, do not violate any of the integrity constraints associated with the state of the database. Isolation requires that even though transactions execute concurrently, it appears to each transaction T that any other transaction executes either before T or after T, but not both. Finally, Durability involves the idea that once a transaction completes successfully, (that is, it commits so that changes will not be lost if a failure occurs), the state of the data is changed to reflect the successful completion of the transaction, and the state of the data will survive system failures.

Database management systems that adhere to these properties generally employ a command language to transform a database from one state to a next. An example command language includes the industry-standard Structured Query Language (SQL).

II. Example of a Multi-Statement Method of Modifying a Database

When using a command language such as the industry-standard SQL command language to modify a database state, the current state of the database must first be determined. For instance, assume that a user desires to place the database in a state wherein a record having a primary key value of "Fred MacMurray" stores specified phone number and address information. To accomplish this using a prior art SQL command language, a call to the DBMS must be made to determine whether a record having the primary key value of "Fred MacMurray" already exists. If so, a second call to the DBMS is then initiated to update the target record. For instance, a call may be initiated by executing an UPDATE command, also referred to as an UPDATE statement, to update the existing record. If the record does not exist, however, an INSERT command (or INSERT statement) is executed to call the DBMS. This call will create the record and provide the requisite values in the corresponding columns.

The following SQL code fragment provides statements to accomplish the foregoing in a C language context. As discussed above, name is the primary key for this table:

```
SELECT * FROM my_table WHERE name='Fred MacMurray';
if (dbms_status==no_find_status)
{
INSERT INTO my_table (name, address, phone)
    VALUES ('Fred MacMurray', '123 Main', '612-555-3728 ');
}
else
{
UPDATE my_table SET name='Fred MacMurray',
    address='123 Main',
    phone='612-555-3728 ' WHERE name='Fred MacMurray';
}
```

Each of the SELECT, INSERT, and UPDATE statements appearing in the above code sequence initiate a respective call to the DBMS, and result in an associated response that is returned by DBMS to the calling program. As such, this process requires the database to be accessed twice. The first database reference results from execution of the SELECT statement, which makes a call to DBMS to determine the database state. The second database call, which is initiated by execution of the INSERT or UPDATE statement, either creates a new record, or updates an existing record, respectively. The one of these actions that is actually taken will depend on whether the SELECT statement locates the record of interest.

Requiring two trips to the database in the foregoing manner is costly both in terms of time and system resources. This is particularly true if the database resides on a first computer system, and the application program referencing the database resides on a different system, since two remote calls will be required to complete the transaction. Moreover, because a lock is not maintained on the database between the time the SELECT statement is completed and the time the UPDATE or INSERT statement is initiated, another transaction may change the database state so that it is different from that determined by the SELECT. As a result, an error may occur, either because a record located by the SELECT statement has subsequently been deleted, or because a record has been inserted into the database in the interim such that an INSERT statement attempts to create a duplicate record.

III. Synchronization System and Method of the Current Invention

The current invention provides a synchronization operation that addresses the above-described limitations. The synchronization operation is performed using a single call to the DBMS. That is, this operation is initiated via execution of a single statement. The synchronization operation changes the contents of one or more columns within a specific row (record) of a database table if that row already exists. Otherwise, if that row does not already exist, the specified contents are inserted into the database table.

In one embodiment, the synchronization operation is implemented using a SYNCHRONIZE keyword. This keyword is used in conjunction with an existing SQL statement such as an UPDATE or an INSERT statement. In another embodiment, the synchronization operation may be initiated by a "stand-alone" statement that is not used in conjunction with any other statement.

In the exemplary embodiment described below, the SYNCHRONIZE keyword is used in conjunction with a SQL UPDATE statement according to the following syntax:

UPDATE table-specification
[SYNCHRONIZE] VALUES (value-list)
WHERE Boolean-expression
[RETRIEVE INTO embedded-variable-specification-list]

The UPDATE, VALUES, and WHERE character strings are keywords that must be included within the code sequence. The SYNCHRONIZE and RETRIEVE INTO character strings are optional keywords that may, but need not, appear within the sequence. The character strings listed in italics are user-supplied parameters. The character strings have the following significance.

The UPDATE keyword indicates that some type of UPDATE operation is being invoked. In this embodiment, the optional SYNCHRONIZE keyword appearing in the second line of the syntax indicates that the special synchronize type of operation is being invoked. As discussed above, this operation can be executed without prior knowledge of the state of the database, as is described in detail below. If the SYNCHRONIZE keyword were absent from this statement, it is assumed that a conventional update operation is being invoked that requires that the database state be determined prior to modification of the state of the database. Following the UPDATE keyword, a user-supplied table name is provided to uniquely identify the database table that is to be the target of the UPDATE SYNCHRONIZE statement.

As previously mentioned, the second line of the syntax includes an indication as to the type of UPDATE operation which is being performed. In the current example, the optional character string "SYNCHRONIZE" appears, indicating that database synchronization is being initiated.

Following the SYNCHRONIZE keyword is the VALUES keyword, which indicates that an ordered list of values follows. This ordered list includes data values that may be stored within respective columns of the record as a result of execution of the SYNCHRONIZE UPDATE operation. In one embodiment of the synchronization operation, this list must include a value for every column that appears in the table, with the values being provided in an order corresponding to that of the columns. According to the foregoing example, this list would include the values 'Fred MacMurray', '123 Main', and '612-555-3728' for the columns name, address, and phone number, respectively.

The data values provided in the values list may, but need not, be used to update the identified record. Whether the provided data values are used to update the record will depend on the state of corresponding indicator variables that are included with the UPDATE statement. According to one embodiment, an indicator variable is allowed for each of the values in the statement. If the corresponding indicator variable is set to a first predetermined value, the data value provided following the VALUES keyword is used to update the respective column. If, however, the indicator variable is set to a second predetermined value, the data provided with the UPDATE statement is ignored, and the data stored within the column of the record remains unchanged. This use of indicator variables will be discussed further below.

Returning to a discussion of the UPDATE SYNCHRONIZE syntax, the third line includes the keyword WHERE followed by a Boolean expression. In this embodiment, the WHERE clause must specify the entire primary key field for each primary key column in the target record. This specification is accomplished using only the equality operator. Thus, in the current example, this clause appears as "WHERE name='Fred MacMurray'".

Finally, the last line in the syntax includes an optional RETRIEVE INTO clause. In one embodiment, when the RETRIEVE INTO clause is utilized, a variable must be provided for every column in the table. Each variable is used to store the updated data value retrieved from a respective column of the table.

Returning to the foregoing example, the following UPDATE SYNCHRONIZE statement may be used to replace the prior art SELECT/UPDATE/INSERT series of statements listed above, as follows:
 UPDATE my_table
 SYNCHRONIZE VALUES ('Fred MacMurray', '123 Main', '612-555-3728')
 WHERE name='Fred MacMurray'
 RETRIEVE INTO :name_retrieve, :address_retrieve, :phone_retrieve This UPDATE statement changes the database table "my_table" to a state wherein it includes a record having a primary key value of "Fred MacMurray" whose telephone and address information is as contained in the statement. This statement will be completed without regard to whether a record having a primary key value of 'Fred MacMurray' existed prior to execution of the statement. After the state has been changed in this manner, the contents the name, address, and phone columns are retrieved from the table and stored within the variables :name_retrieve, :address_retrieve, and :phone_retrieve respectively. In this example, the retrieved values will be the same as those appearing following the VALUES keyword. However, this need not be the case, depending on indicator values, as is described further below.

Before the current invention is described in more detail, it is useful to consider the locking sequences used in conjunction with prior art update and insert mechanisms.

IV. Limitations of Prior Art Locking Mechanisms Used to Facilitate Database State Changes In a multi-processing environment, more than one transaction may be submitting requests to insert, modify, and delete the records of a database. DBMS 106 therefore manages software locks to prevent two transactions from simultaneously attempting to modify a record at the same time, resulting in an unpredictable outcome. When a transaction seeks to update a particular record, the transaction will generally make a request to DBMS 106 requesting that an appropriate lock be granted on either that record, or the page on which that record resides. Similarly, when a transaction seeks to create a new record, the transaction will generally make a request to DBMS 106 requesting the granting of an appropriate lock for the page on which the newly-created record will reside.

Several types of software locks are available to lock either a record or a page in the foregoing manner. According to a first type of lock, which will be referred to as a READ lock, the transaction that obtains the lock is able to read from, but not write to, the locked record or page. Another type of lock, a WRITE lock, allows a transaction that obtained the WRITE lock to both read from, and write to, the locked record or page. If a transaction obtains a WRITE lock, another transaction may not obtain any other lock (either READ or WRITE) on the locked record or page until the lock is deactivated. If a transaction obtains a READ lock on a record or page, another transaction may obtain a READ lock, but not a WRITE lock, on that same record or page.

In some prior art systems, before an update operation is initiated, a READ lock is acquired for the page that contains the insertion point for the target record. This insertion point may be determined by conducting a search on a hierarchical B-tree or a variant thereof which is used to manage the table, as is known in the art. The activation of this READ lock is sufficient to prevent any other transaction from activating a WRITE lock on the same record or page.

After a READ lock is acquired for the page that potentially contains the target record, a search is conducted on that page for that record so that the record may be updated. If the record is not located on this page, an error results, since the prior art update operation assumes the record will, in fact, exist by virtue of the fact that the update operation was initiated. In this case, the READ lock may be deactivated, and error processing will be initiated. Eventually, an insert operation will be used to create the record, as described above. This insert operation will have to initiate another locking sequence before the database modifications may be performed.

Assume, however, the case wherein an error does not occur because the target record is located on the page containing the insertion point. When the record is located, a WRITE lock is requested for the page. After this lock is acquired, the update operation may be initiated. Sometime in the future, these database updates will be "committed" to the database so that they are made persistent, and will not be lost if a system failure occurs. This may be accomplished by writing the updates to a system log or audit trail which exists on mass storage. Another method writes the updates from memory of the database management system to a file in mass storage containing the updated page. Either of these mechanisms may be employed immediately after the updates are performed, or after a predetermined additional number of modifications have been made to the database. After the updates have been made persistent, the READ and WRITE locks may be deactivated on the page.

From the above discussion, it is apparent that the READ lock is utilized to lock the target page until after it has been determined that the target record exists at the insertion point. A READ lock is used instead of a WRITE lock because if the search determines the record does not exist, the READ lock may be deactivated before error processing occurs, thereby allowing other transactions to gain write-access to the page. If a WRITE lock were employed instead from the outset of the update operation, the WRITE lock would be required to remain activated until the conclusion of error processing. This is so because WRITE locks are of a "transaction duration", meaning they must remain activated until the transaction either commits such that the changes are made persistent, or the transaction is instead rolled back so that the changes are all discarded. Thus, for those types of situations wherein it is unknown whether a target record exists at the outset, the use of a locking sequence containing both READ and WRITE locks improves performance because other transactions are not stalled, waiting for the lock to be deactivated in the event error processing must be initiated.

In reference to the foregoing, it is important to note that any prior art database modification or creation of a target record that is accomplished using the UPDATE or INSERT statement, respectively, may result in an error. This is true even if the transaction issuing the statement first ascertains the state of the database as via a SELECT statement. An error may result because some other intervening transaction may delete or insert a record between the time the first transaction ascertains the database state and the time that same transaction initiates database modification. Because any prior art sequence of multiple statements to ascertain a database state, and then update that state, runs the risk of resulting in an error situation, it is desirable in prior art systems to use the two-part locking sequence discussed above.

Irrespective of the foregoing, several limitations exist with the above-described locking mechanism associated with prior art update operations. As discussed above, the system must first obtain a READ lock followed by the acquisition of a second WRITE lock. Later, both of these locks must be de-activated. All of these operations require the issuance of requests to the database management system, slowing processing throughput.

The problem outlined above is exacerbated in a configuration wherein the database is shared between multiple servers. In this type of configuration, an independent Record Lock Processor (RLP) or a distributed lock manager is generally used to manage locking of database pages and records. All of the servers must submit lock requests to the RLP before access to a target record or page may be obtained. Because the RLP may be located remotely to any of the servers, the issuance and granting of the lock activation and deactivation requests may impose a substantial delay.

Moreover, the prior art locking mechanism poses the potential for the occurrence of a deadlock situation. Specifically, after the READ lock is activated on a page by a first transaction, but before the WRITE lock is obtained so that an update operation may be initiated, a second transaction may be granted a READ lock on this same page. This may occur because READ locks are considered compatible with one another such that two transactions may acquire a lock on the same record or page at once. In this type of scenario, it is likely that both transactions will issue a subsequent WRITE lock request for this page sometime in the future. Since granting of either WRITE lock request will be dependent upon the deactivation by the other transaction of its acquired READ lock, neither WRITE lock will be granted. Therefore, deadlock will result.

According to one type of deadlock detection mechanism, DBMS monitors lock requests. When a lock request cannot be granted immediately, as is the case in the above-described scenario, the DBMS stalls the requesting transaction for a period of time. When that time has elapsed, the DBMS examines the lock requests for the possibility that a deadlock situation has resulted. According to a variation of this mechanism, DBMS may determine whether a deadlock situation has occurred at the time the lock request is being made without waiting for expiration of a delay period. In either scenario, if a deadlock scenario has arisen, the DBMS rolls back the updates made by one of the transactions so the other transaction(s) may proceed. The transaction(s) that are rolled back must be re-started at a later time, seriously impacting their performance.

The above paragraphs describes a two-part prior art locking mechanism employed by some prior art systems to lock a database page so that a state change may be accomplished. Other prior art systems utilize a similar record-level locking mechanism instead. This similar locking mechanism utilizes a two-part sequence including a LATCH lock followed by a WRITE lock. While the specifics of the LATCH lock are largely beyond the scope of the current invention, it may be noted that this two-part sequence is associated with the same types of problems discussed above with respect to the READ/WRITE locking sequence.

The synchronization system and method described herein addresses the above-described limitations associated with the two-part locking sequence of the prior art multi-statement database update approach.

V. Locking Mechanism of the Synchronization Operation

The UPDATE SYNCHRONIZE statement is able to utilize a singular locking mechanism largely because this statement does not presume that the database is in any predetermined state at the time of execution. Therefore, no error will be generated if the target record is, or is not, located within the database. Thus, there will be no need to deactivate a READ lock early, as there was when an error was generated during execution of a prior art update or insert operation. It follows, then, that there is no particular reason to prefer a READ lock over a WRITE lock when the synchronization operation is initiated. Instead, a single WRITE lock request may be employed to lock the page that contains the insertion point for the target record. This eliminates the possibility that a deadlock situation will occur, since a transaction will not be granted a WRITE lock until all other locks on the record or page are relinquished. Once the WRITE lock is obtained, no other transaction can obtain a lock on the locked entity until the synchronization operation is completed.

The use of the single WRITE lock further improves performance because only a single request must be submitted to the database management system. This is particularly important in configurations wherein lock activation and de-activation requests are issued to a remotely-located RLP, a process that may be time-consuming.

It may be noted that the WRITE lock is an appropriate choice for use with the synchronization operation since this operation will almost always be associated with a database modification. That is, either an existing record will be updated by the synchronization operation, or a new record will be inserted. Thus, a WRITE lock is almost always required to complete this operation. Only in rare instances will this operation be employed exclusively to read record contents using the list of variables provided in conjunction with the RETRIEVE INTO keywords.

Several different types of WRITE locks are available for use by the synchronization operation. A first type of lock will be used to lock the entire page containing a target page. This type of lock is required if the synchronization operation will insert a record into the table, change the size of the column, or change the primary key value such that the record is moved to a different location in the B-tree. The entire page must be locked in these situations because these operations affect more than just the storage space that is already allocated to an existing record. For example, because records are sorted in primary key order, changing the primary key value will require a record to be deleted from a first location, and then moved to a new location within the B-tree such that additional storage space must be allocated. A similar situation exists for records stored in a hash structure, since changing the primary key value also changes the hash value computed from the primary key value.

A second type of WRITE lock only locks one or more target records. This type of lock, sometimes referred to as a "predicate" lock, may be utilized if the operation is only going to update a record in a manner that will not increase the size of any of the columns and will not cause the record to move to a different location in the B-tree (that is, a primary key update is not being performed). As an example, a predicate lock may be used to lock all records with "name='Fred MacMurray'". A variation of this lock request uses a statement such as "name LIKE 'fred %'" to locate and lock all records having a name field beginning with "Fred".

Because the synchronization operation often affects more than the storage space of an existing record, it is generally necessary to lock an entire page. For this reason, one embodiment of the invention always requests a page-level WRITE lock on a target page. This ensures the necessary locks have been activated on the current page at the time the update or insert operation will occur, regardless of whether additional storage space must be allocated on that page to accomplish the insertion.

In some cases, the synchronization operation may require the initiation of a page split operation. This may occur, for example, if the target page does not contain enough storage space to accommodate a newly inserted record. To address this situation, another page is allocated. A WRITE lock is acquired for this new page as well. Then some of the records from the target page are moved to this new page. The WRITE locks acquired for the new page and the existing page are maintained until the synchronization operation completes.

It may be noted that while a predetermined embodiment utilizes a page-level WRITE lock on a target page, an alternative embodiment of the current synchronization operation may initially request a predicate lock on the target record. If this "record-level" lock is later determined to be inadequate, a subsequent page-level WRITE lock request may be issued. This alternative embodiment provides the advantage of allowing other transactions to continue reading from, and writing to, other records on the same page even while the UPDATE SYNCHRONIZE statement is being processing. However, this embodiment may result in the stalling of synchronization execution, since one or more other transactions may have acquired a lock that must be deactivated before the page-level WRITE lock can be granted.

VI. Processing of Data Values and Indicator Values

Next, processing of the list of data values provided with the UPDATE SYNCHRONIZE statement is considered in more detail. As mentioned above, according to one embodiment of the synchronization operation, the UPDATE SYNCHRONIZE statement includes a list of data values that follows a VALUES keyword. This list, which is passed by the calling program, must include a data value for each of the columns in the target database table. These items must appear in the same order as the database columns. These items may, but need not, be used to update the corresponding columns of the identified record.

As one example, assume the list of data values 'Fred MacMurray', '123 Main', and '612-555-3728' is to be provided within an UPDATE SYNCHRONIZE statement. Each of these data values may be listed parenthetically following the VALUES keyword, as follows:

VALUES ('Fred MacMurray', '123 Main', '612-555-3728')

Since the data values are specifically listed in this statement, the system assumes that these values will be used to update a respective column of "my_table". For example, the character string "Fred MacMurray" will be used to update the corresponding first table column, the address information '123 Main" will be used to modify the second column, and so on.

Another way to provide the data is through the use of data variables. For example, the data variable ":namevar" may be used to store the character string 'Fred MacMurray'. Similarly, the data variables ":addressvar" and ":phonevar" may be used to store the address and telephone information, respectively. Prior to execution by the calling program of the UPDATE SYNCHRONIZE statement, the calling program stores the name, address, and phone number information in the corresponding data variable using the syntax in the implementation language of the calling application, for example the '=' assignment statement in the C language. Thereafter, the UPDATE SYNCHRONIZE statement may be called having a values list that includes a list of data variables rather than the actual data as follows:

VALUES (:namevar, :addressvar, :phonevar)

According to one syntax implementation, the data variables or data values are comma delimited, parenthetically, as shown above. Many other formats may be used in the alternative.

When the VALUES keyword is followed by a list of data variables rather than actual data values, the system may utilize an indicator variable to determine whether a value stored by a respective data variable will be used to update the corresponding table column. This provides a way to update only selected items of the table.

In one embodiment, an indicator variable is always paired with a respective data variable. Returning to the foregoing example, a respective indicator value is provided for ":namevar", another indicator value is paired with ":addressvar", and so on.

Many different mechanisms are available to pair a data variable with its respective indicator variable. For example, assume that the indicator variables ":nameind", ":addressind", and ":phoneind" are defined for use with ":namevar", ":addressvar", and ":phonevar", respectively. One embodiment supports the following syntax for the values list:

VALUES (:namevar :nameind, :addressvar :addressind, :phonevar :phoneind")

According to the above syntax, the data variable appears first followed by its corresponding indicator variable. The data/indicator variable pairs are comma delimited. Alternatively, a correlation between data and indicator variables may be created by a defining a variable naming convention. Other mechanisms are available for creating these associations. In one embodiment, an indicator variable may be omitted from the data/indicator variable pair, in which case the indicator value is assumed to be a predetermined default value, as will be described further below.

Each indicator variable stores a value that must be initialized by the calling program prior to execution of an UPDATE SYNCHRONIZE statement. This may be accomplished using an '=' assignment statement, for example.

During execution of the synchronization operation, the value of an indicator variable is used in conjunction with the database state to determine whether the corresponding data value is to be used to update the target record. For example, assume the target record is located within the database such that an update operation will occur. Indicator values may be defined such that if the record is located, only those columns associated with an indicator having a value of "0" will be updated. All of the columns for which the indicator value is set to "1" will remain unchanged such that the data stored within the corresponding data variable will be ignored. If all indicator values for all columns are set to "1", none of the columns will be updated. In this case, the contents of the record columns will be retrieved and stored into corresponding variables listed in the RETRIEVE INTO clause, assuming this clause is included in the statement. Finally, if an indicator variable stores a "-1", the corresponding column will be modified to a "NULL" value.

It may be appreciated that while the current embodiment employs the indicator values "-1", "0", and "1", any other values may be used in the alternative. For example, the values "1", "2", and "3" may be employed to represent the three indicator states. Alternatively, "any negative value", "0", and "any positive value" may be employed to identify the indicator states. Additionally, although the current embodiment employs three indicator states, other embodiments may use more or fewer states. Finally, although in one embodiment, indicator variables are only employed when data variables rather than "hard-coded" data values follow the VALUES keyword, indicator variables may be employed in both scenarios. The use of indicator values can best be understood by the example of FIG. 2A.

Figure 2A:
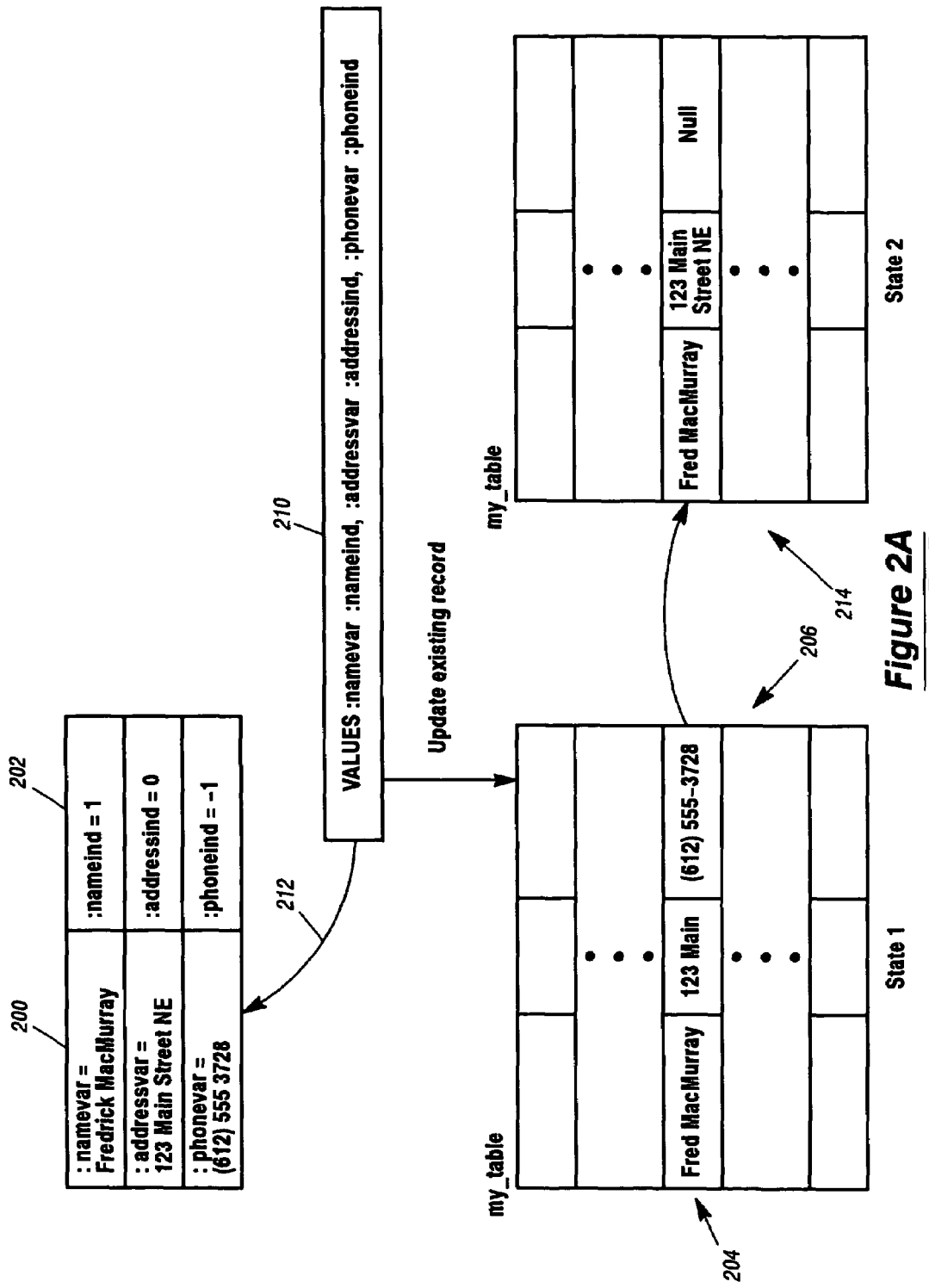
FIG. 2A is a block diagram illustrating the use of data variables and corresponding indicator variables when a record is found to be present during one embodiment of the synchronization operation.

FIG. 2A is a block diagram illustrating the use of data variables and corresponding indicator variables when a record is found to be present during the synchronization operation. For this example, assume that the data variables ":namevar", ":addressvar", and ":phonevar" store the values 'Fredrick MacMurray', '123 Main Street NE', and '612-555-3728', respectively, as shown in variable array 200. The indicator variables ":nameind", ":addressind", and ":phoneind" store the values "1", "0", and "-1", respectively, as shown in variable array 202. It will be assumed that these indicator values correspond to the first, second, and third columns of the database table, respectively. Finally, assume that a target record 204 of database table my_table 206 stores a primary key value of "Fred MacMurray". Because this target record exists, a synchronization operation will update the record, rather than perform a record insertion.

During processing of the SYNCHRONIZE UPDATE statement, a list of values following the VALUES keyword is obtained. This list, which is shown in block 210, is parsed, and both of variable arrays 200 and 202 are accessed, as indicated by arrow 212. Because the character string "Fredrick MacMurray" stored in variable ":namevar" is paired with an indicator value of "1", the first column of the database table will not be updated to store this string, but instead will remain set to 'Fred MacMurray'. However, the second column containing the address information "123 Main" will be updated to store the new character string "123 Main Street NE" since the corresponding indicator variable, ":addressind", is set to "0". Finally, the last column containing telephone information will be set to "NULL" because indicator variable ":phoneind" has a value of "-1". This updated state of the table is illustrated in block 214.

As noted above, the indicators are used in a different manner if the record does not exist within the database such that it must be created. In this case, the data value appearing within the values list will be inserted into the appropriate column if the corresponding indicator is set to either "0" or "1". If an indicator stores a "-1" value, the corresponding column is set to "NULL".

Figure 2B:
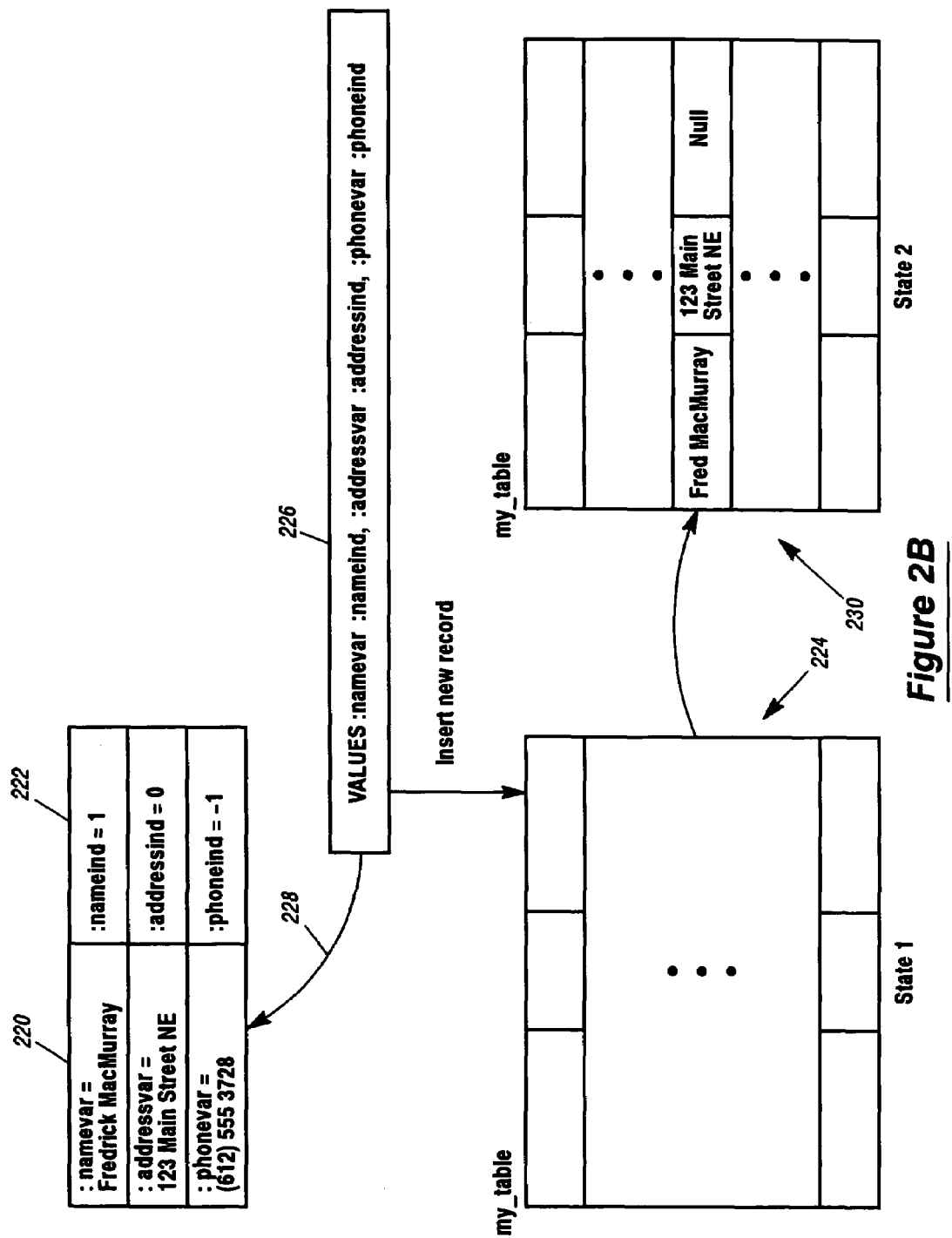
FIG. 2B is a block diagram illustrating the use of data variables and corresponding indicator variables when a record is not present during one embodiment of the synchronization operation.

FIG. 2B is a block diagram illustrating the use of data variables and corresponding indicator variables when a record is not present during the synchronization operation. Assume that the data and indicator variables have the values described above, as shown in arrays 220 and 222. During execution of the synchronization operation, the target record having a primary key value of "Fred MacMurray" is not located within my_table 224. Therefore, a new record will be created.

During processing of the list of values following the VALUES keyword, as shown in block 226, both of arrays 220 and 222 are accessed, as indicated by arrow 228. Because the indicator variable ":nameind" is set to "1", the character string stored within the corresponding data variable ":namevar" will be stored in column 1 of the new record. Similarly, because ":addressind" is "0", the address information stored within ":addressvar" will be stored within the second column. Finally, the last column of the record will be set to "NULL" because indicator variable ":phoneind" stores a value of "-1". This updated state of the table is illustrated in block 230. In another embodiment, a "-1" indicator value will cause the corresponding column to be set to a predetermined default value that is selected for use with that column.

According to one aspect of the invention, when a new record is created, data must always be provided for the primary key field(s) of a record. The values stored within the respective indicator variables will be ignored for these primary key field(s). That is, these fields cannot be set to a default value. In other embodiments, indicator variables or another mechanism may be used to cause default values to be stored in one or more fields instead.

FIG. 3 is a table that summarizes the manner in which indicator variables are used in one embodiment of the invention. Column 300 lists the type of action that is being performed during synchronization, which may include creating a new record after the target record is not located, or modifying an existing target record. Columns 302, 304, and 306 show how existing record data will be affected for indicator values of "−1", "0", or 1", respectively, for each of the possible synchronization activities.

As noted above, one reason prior art systems have not provided a uniform synchronization approach that can handle both update- and insert-type operations involves the different data requirements between the two types of operations. When an INSERT statement is executed, data is generally provided for each of the columns of the database, since each column will be "empty" at the time of record creation. In contrast, when an UPDATE statement is executed, it is generally desirable to provide data for only the selected columns that are to be modified, leaving the remaining columns unchanged. The current system and method solves this problem by providing indicator variables that may be defined to initiate different actions based on the state of the database table. For example, an indicator value of "1" can be used to retain a value stored within a table column for a first database state (i.e., the target record has already been created within the table), or instead update that column if a second database state exists (the target record is not located in the table.)

As previously noted, the current embodiment implements the synchronization operation as a variant of an UPDATE statement. In other words, a newly-defined SYNCHRONIZE keyword is used in conjunction with an UPDATE statement to trigger processing for the synchronization operation. Other embodiments may utilize a SYNCHRONIZE keyword in conjunction with an INSERT statement to initiate the synchronization operation. Any keyword or other mechanism which alters the behavior of the conventional UPDATE or INSERT operation to synchronize the state of a database table via a single call to the DBMS may be used in the alternative. Still other embodiments may associate the functionality with an entirely new SYNCHRONIZE statement that is used alone rather than in conjunction with another statement.

Figure 4A:
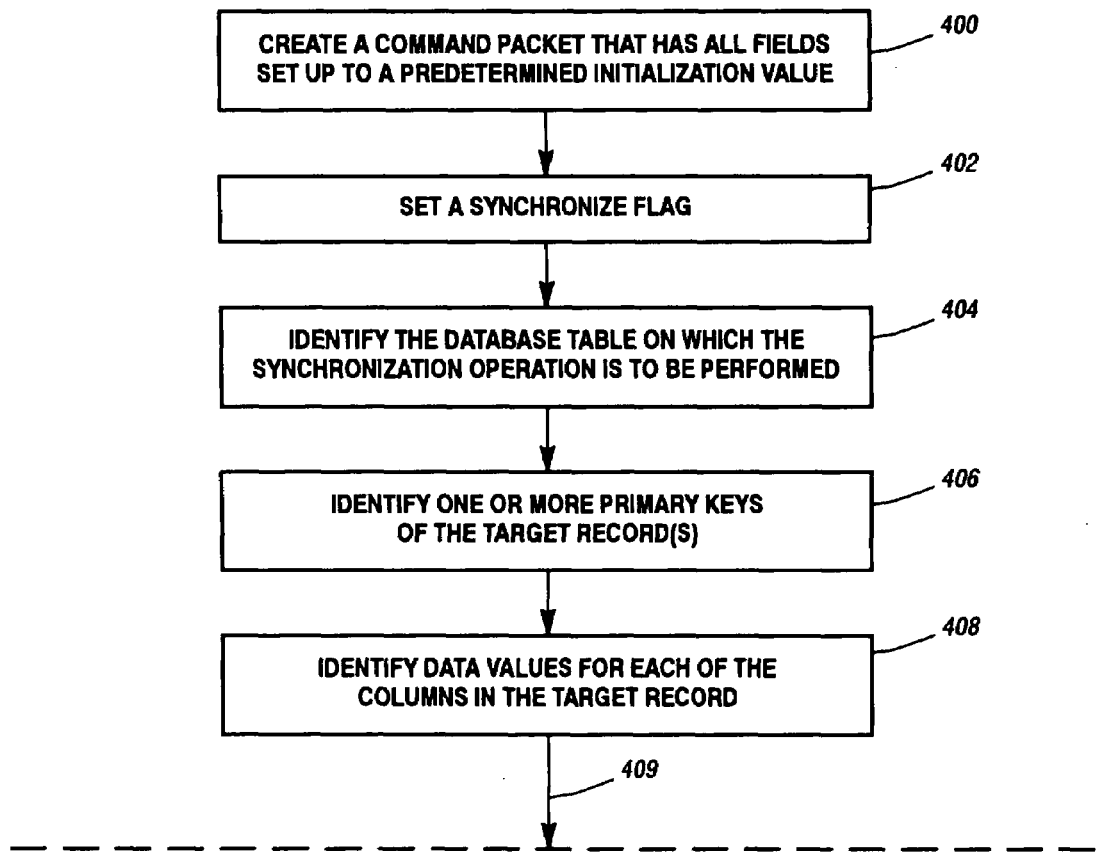
FIGS. 4A and 4B, when arranged as shown in FIG. 4, are a flowchart illustrating one method of building a command packet to initiate a synchronization operation via a single statement according to an embodiment of the current invention.
Figure 4B:
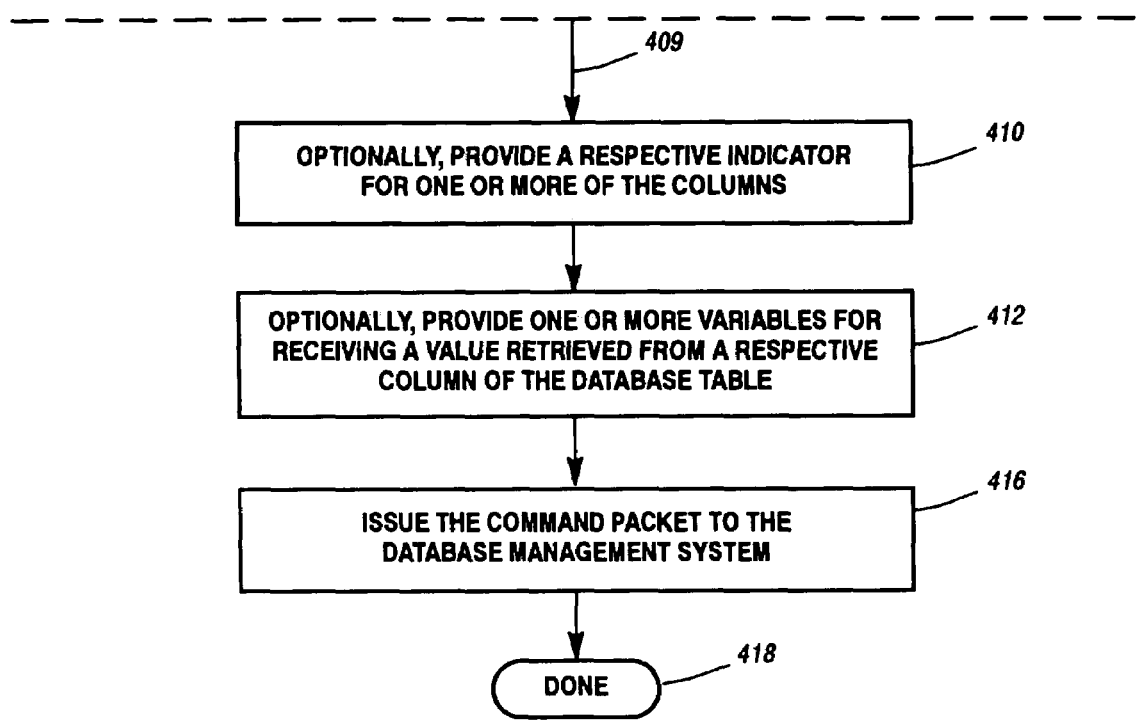

FIGS. 4A and 4B, when arranged as shown in FIG. 4, are a flowchart illustrating one method of building a packet to initiate a synchronization operation according to an embodiment of the current invention. This packet may be built in a number of ways. It may be built in its entirety by the compiler prior to run-time by parsing a statement that includes one or more keywords and parameter lists. Alternatively, some, or all, of the packet may be built at run-time by the run-time system. This packet is passed from the calling program to the database management system at run-time to initiate the synchronization operation.

First storage space is allocated for the command packet. All fields of this command packet are first set to a predetermined initialization value, which may be zero or some other value (400). A synchronize flag of the command packet is set to indicate synchronization will be performed (402). In one embodiment, this flag is set by recognizing the existence of a SYNCHRONIZE keyword used in conjunction with some existing statement such as an INSERT or UPDATE statement. Next, the database table on which the synchronization operation is to be performed is identified within an appropriate field of the command packet (404). Additionally, one or more primary keys of the target record are identified, as by storing the key values in an appropriate field of the command packet (406). In one embodiment, the primary key value(s) are obtained by parsing a WHERE clause of the command syntax.

Next, the data values are identified for the target record (408). In one embodiment, the data values may be obtained by parsing the statement itself, as was the case in the example above wherein the data values were contained in a comma delimited list following the VALUES keyword. In another embodiment, the comma delimited list instead identifies data variables that store the corresponding data values. In either case, these data values may be stored within the appropriate field(s) of the command packet.

In one embodiment, a data value must be identified for each of the columns in a record. In another embodiment, only the primary key columns must be included in the command packet, with all other columns being considered optional. If an optional data value is not provided, that column is set to a corresponding default value if record creation is required.

In one implementation, the list of items following the VALUES keyword indicates how data values correspond with the table columns. That is, the first item in the list corresponds with a first predetermined column, and so on. This ordering information is incorporated into the command packet. For instance, a first data value or data variable in a parsed list is stored within the field of the command packet corresponding with the first column of the table, and so on. It may be noted that in an embodiment that requires identification of the data via a list of variables, the variables may, but need not, be included in a list in a predetermined order. If they are not included in any predetermined order, the association between the variable and the table column may be made using some other mechanism, such as by using a predetermined associated between variable name and table column name.

Processing next continues to FIG. 4B, as indicated by arrow 409. In step 410, a respective indicator value may optionally be identified for one or more of the table columns to indicate how data is to be updated or inserted in the corresponding column. In one embodiment, these indicator values may be identified by specifying variable names within the command packet. In another embodiment, these indicators may be provided by including an actual value in the command packet. The values may be retrieved from the parsed statement or from a variable identified by the parsed statement. Finally, one or more variables may be identified in the command packet for use in receiving data retrieved from respective columns of the table (412). In one embodiment, these variables are identified from a parsed list that follows a RETRIEVE keyword. The command packet may then be passed to the database management system to initiate the synchronization operation (416). The command packet processing is then considered complete (418).

Several observations may be made regarding the process of FIG. 4. First, all of steps 400 through 412 may be performed prior to run-time, or all may be performed at run-time. Alternatively, some of the steps may be performed prior to run-time, and some may be performed at run-time, if desired. Step 416 will be performed at run-time to pass the data contained within the command packet from the calling program to the database management system. It may further be noted that many of the steps shown in FIG. 4 are not order-specific, and thus may be performed in a different order than that shown. Finally, FIG. 4 does not specifically describe a format for the command packet since virtually any predefined packet format may be used to store information from a statement such as an UPDATE SYNCHRONIZE statement for transfer to the database management system.

Figure 5A:
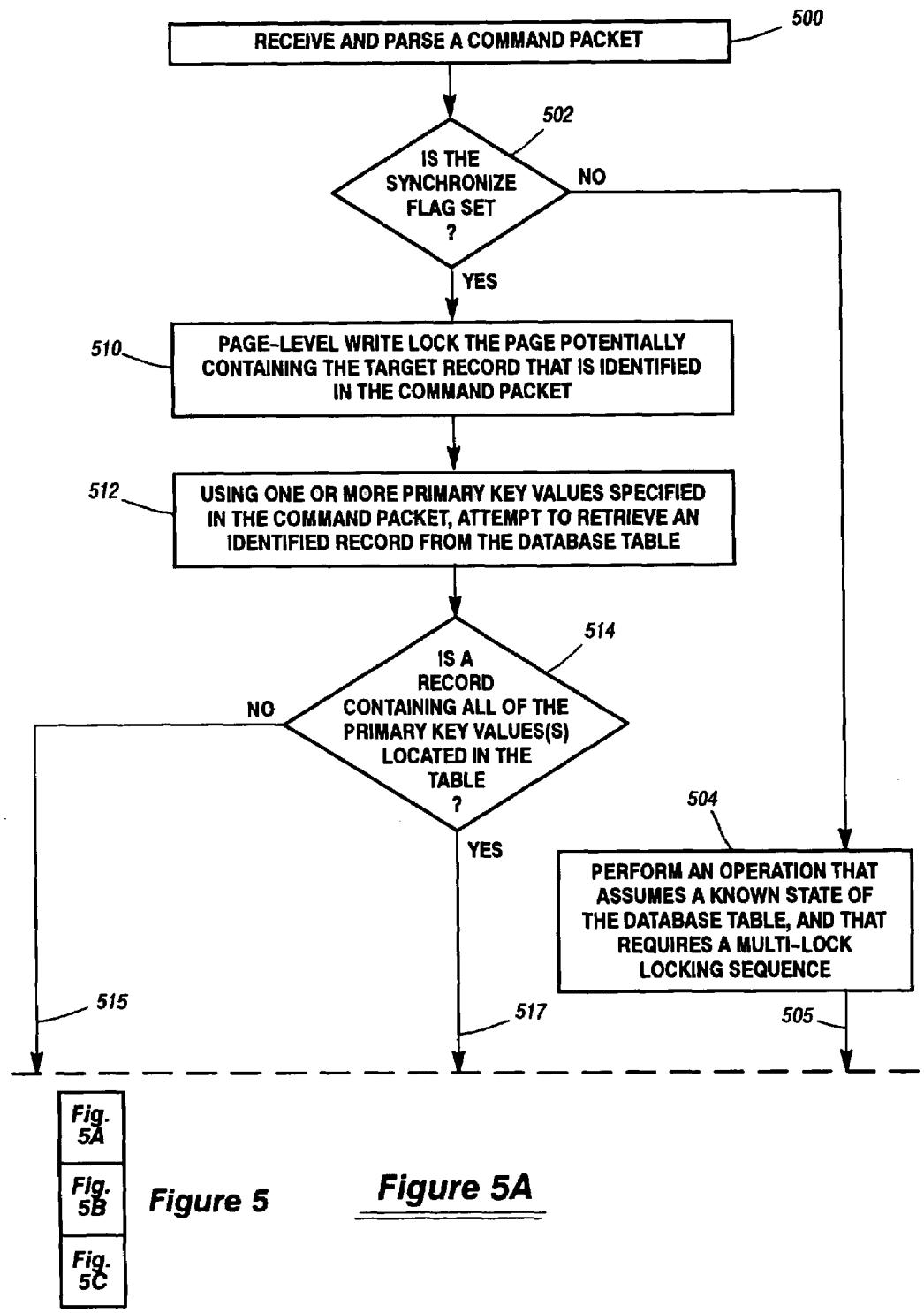
FIGS. 5A, 5B, and 5C, when arranged as shown in FIG. 5, are a flow diagram illustrating one embodiment of the synchronization operation initiated via a single statement in accordance with the current invention.
Figure 5B:
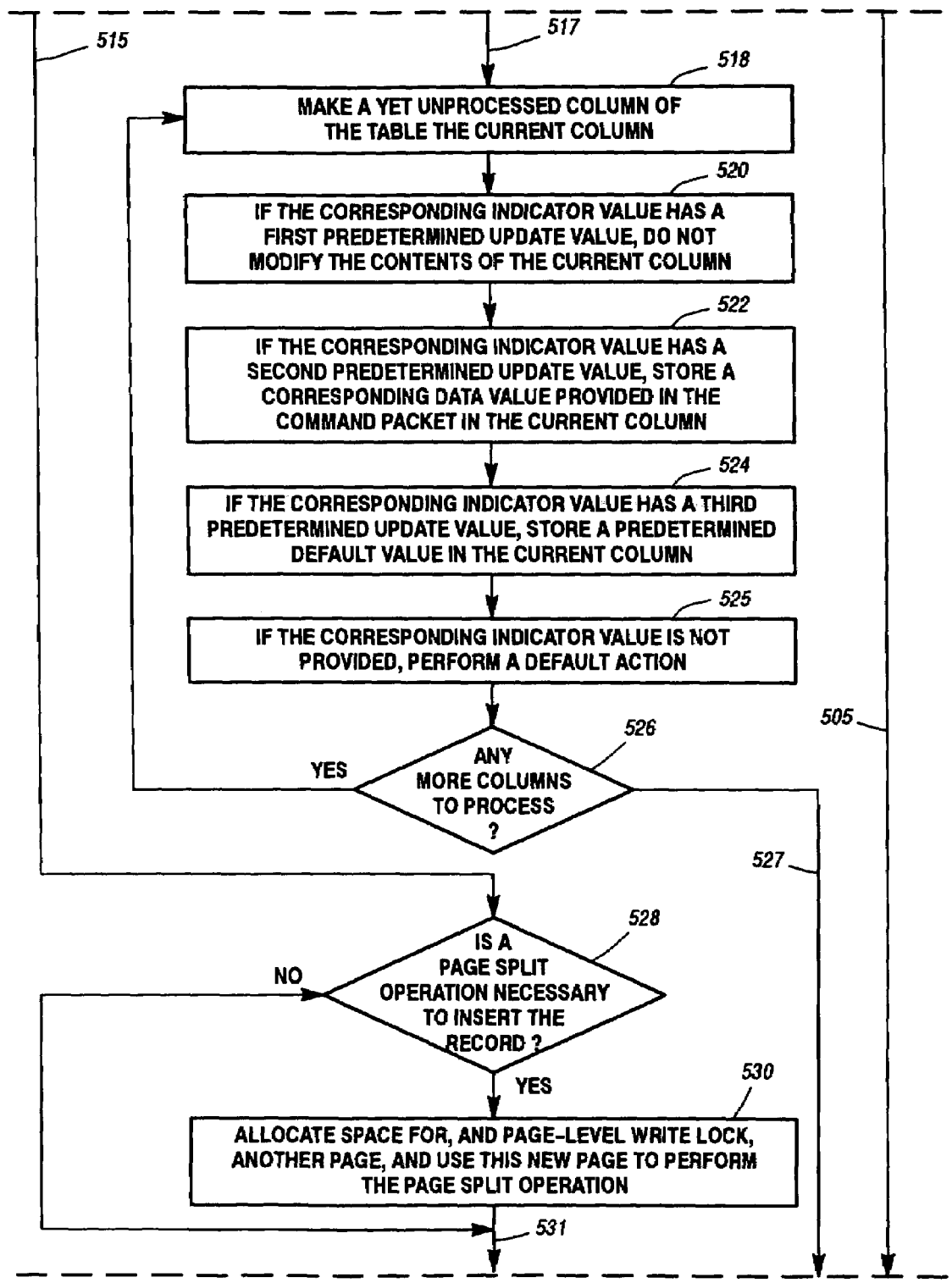
Figure 5C:
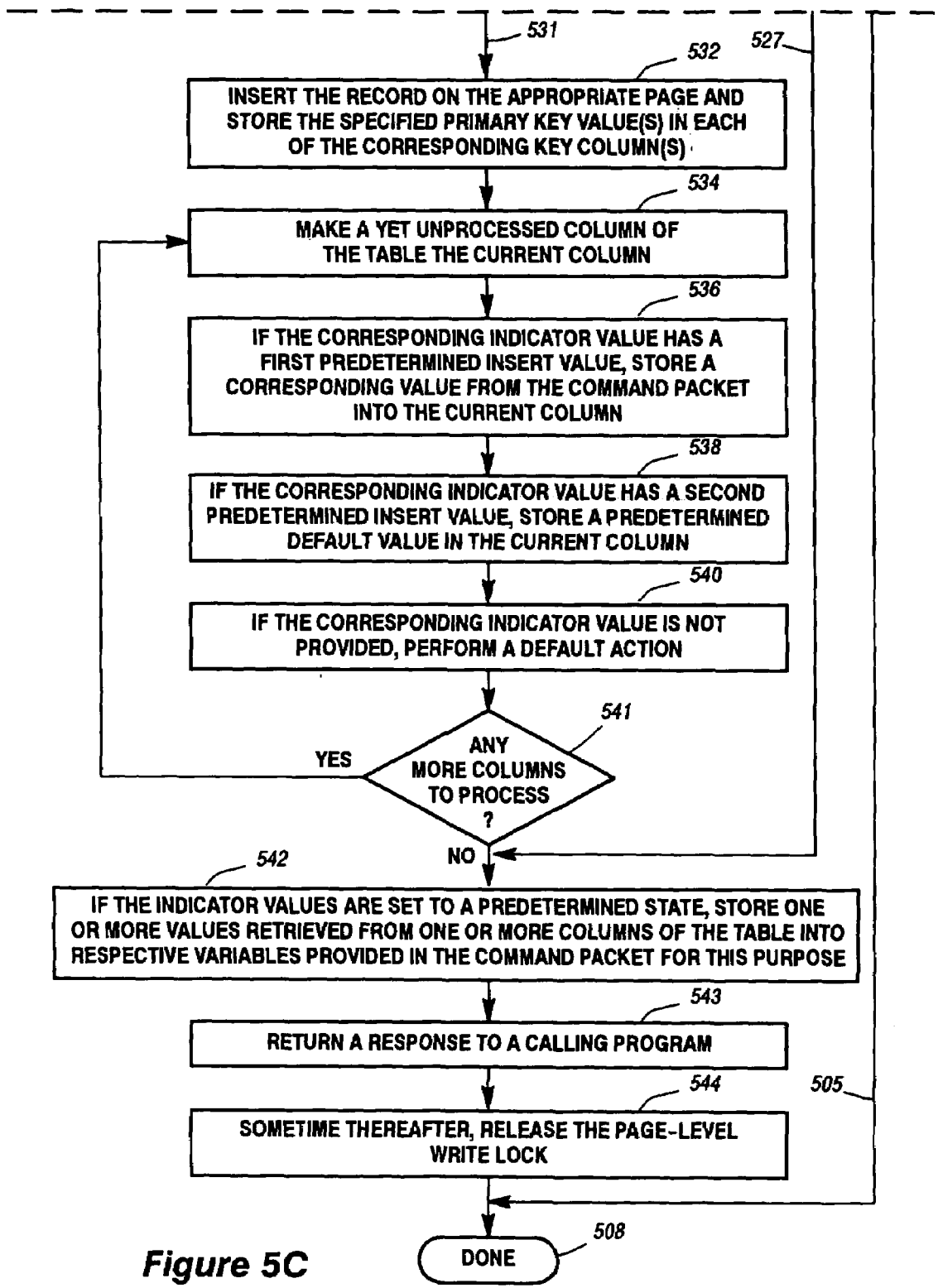

FIGS. 5A, 5B, and 5C, when arranged as shown in FIG. 5, are a flow diagram illustrating one embodiment of the synchronization operation in accordance with the current invention. This embodiment utilizes a command packet, which may, but need not, be the command packet for an UPDATE SYNCHRONIZE statement. This command packet is received and parsed by the database management system (500). The state of the synchronization flag is determined in step 502.

If a command packet is received that does not contain an activated synchronization flag, the command packet was issued as a result of a conventional statement such as a prior art UPDATE statement that was not accompanied by a SYNCHRONIZE keyword. As discussed above, this type of statement assumes that the state of the database has been determined before the issuance of the statement. Thus, execution continues to step 504, where conventional processing occurs using a locking mechanism that requires both the activation of READ and WRITE locks. When this conventional processing is completed, processing continues to step 508 of FIG. 5C where execution is concluded. While the particular details associated with the conventional processing are beyond the scope of the current invention, it is important to note that this processing requires the use of a two-part locking sequence. In addition, this convention processing may result in the return of an error. Both the use of the locking sequence and the occurrence of an error will diminish throughput.

Returning to step 502, if the synchronization flag is set, a page-level WRITE lock is activated on the page that potentially contains the target record that is identified in the command packet (510). This lock will only be activated after other non-compatible locks have been deactivated for this page. As discussed above, in an alternative embodiment, a special type of "predicate" lock may be activated to lock only the target record until it is known that allocation of additional space is required.

Using one or more primary key values that are specified in the command packet, an attempt is made to retrieve the identified record from the database table specified by the command packet (512). If a record containing all of the primary key value(s) is located (514), processing continues to step 518 of FIG. 5B, as indicated by arrow 517.

Next, as shown in step 518 of FIG. 5B, a column of the table that has yet to be processed is made the current column. If a corresponding indicator value is available for this column and has a first predetermined update value, the contents of the current column are not modified by the data that is identified for this column in the command packet (520).

If the corresponding indicator value is available and has a second predetermined update value, the corresponding data value that is identified in the command packet is stored within the column (522). The data value may be included in the command packet, or may be retrieved from a variable identified by the command packet. In one embodiment, the identified data value will also be stored if no indicator value is provided for this column.

If the corresponding indicator value has a third predetermined update value, a default data value is stored within the current column (524). A different default value may be assigned to each column, if desired. A default value cannot be assigned to the primary key column(s), however. In one embodiment, the default value is "NULL" for all columns.

In some cases, an indicator value may not be provided for the current column. In this case, some default action may be taken (525). In one embodiment, this action may involve updating the column with corresponding data contained in the command packet. In another embodiment, this may involve leaving the column unchanged, or storing a default data value within the column.

If any columns remain to be processed (526), execution continues to step 518 where a still unprocessed one of the columns is made the new current column. When all columns have been processed, execution continues to FIG. 5C, as indicated by arrow 527.

Returning to step 514 of FIG. 5A, if a record containing all of the primary key values was not located within the database, processing continues with step 528 of FIG. 5B, as indicated by arrow 515. At step 528, if a page split operation is necessary to insert the record having the identified primary key value(s), another page is allocated within the database, and a page-level WRITE lock is acquired for this newly-allocated page. This page is then used to perform the page split operation (530). Many mechanisms are available for splitting the page, and the manner in which this is accomplished is beyond the scope of the current invention. In any event, some records from the original page are likely copied to the new page so that each page has space available for the insertion of additional records. Execution then continues to step 532 of FIG. 5C, as indicated by arrow 531.

Returning to step 528 of FIG. 5B, if a page split operation is not necessary, execution proceeds directly to step 532 of FIG. 5C, by-passing the splitting of the page in step 530.

At step 532 of FIG. 5C, the new record having the identified primary key(s) is inserted on whichever one of the original or the newly-allocated page contains the insertion point. The primary key value(s) are stored within the corresponding primary key field(s) of the record. Next, a yet unprocessed column of the table is made the current column (534). If a corresponding indicator value is any of one or more first predetermined insert values, a data value identified by the command packet is stored into the current table column (536). The data value may be included in the command packet, or may be retrieved from a variable identified by the command packet. In one embodiment, this occurs if the indicator value is "1" or "0".

If an indicator value is set to a second predetermined insert value, a predetermined default value may be stored within the current column (538). A different default value may be selected for each column, if desired. If an indicator value is not provided for the current column, a default action may be taken, such as storing a default value within the column (540). If any more columns remain to be processed (541), execution continues to step 534, where a column that still remains to be processed is made the new current column.

When all columns are processed (541), the command packet is examined to see if any data values must be returned (542). In this embodiment, a variable must be provided for each column, and the contents of every column are retrieved for return to the user. In another embodiment, selective retrieval may occur for only those columns that are tagged by syntax as being OUT or INOUT variables, indicating that they may receive output values.

In one embodiment, indicator values may be assigned to designate a combination of actions associated with a particular column. That is, the values of FIG. 3 may be further encoded to indicate not only a possible update action, but also a retrieval action. As an example, a first indicator value may be used to indicate that data retrieval should occur for the column, and that the data value provided in the command packet should be stored within the column regardless of whether a new record is created, or an existing record is updated. A different indicator value may be used to designate that data retrieval should occur for the column, and that the column should be updated to include newly-provided data if the record must be created, but the column should remain unchanged if the record already exists. Different values may be selected to indicate the foregoing storage options when data retrieval is not desired, and so on. As may be appreciated, many different indicator values may be defined to identify the myriad of possible combinations of possible actions associated with data retrieval and data updates for the columns. Alternatively, multiple indicator variables may be utilized, with one to control the database synchronization operation and another to control the data retrieval operation.

As noted above, the use of the data retrieval capability provides a way to read columns of the database after a WRITE lock is activated for a record. This guarantees that the calling transaction has the capability to later update the record without encountering a deadlock scenario. This is an improvement over prior art fetch or read operations, which are initiated after activation of a READ lock only. After a first transaction activates a READ lock, another transaction may activate a READ lock on the same record at the same time. Since activation of a READ lock is often a precursor to making a subsequent request for activation of a WRITE lock, two transactions may have WRITE lock requests pending for the same record at the same time, resulting in deadlock. The processing required to handle the deadlock situation slows throughput.

According to the current system and method, the diminished throughput associated with deadlock handling will be avoided if a first synchronization operation is used to retrieve one or more record values, and a second synchronization operation is thereafter initiated to perform an update of one or more columns in this same record. The WRITE lock activated during the first synchronization operation will remain activated until a COMMIT operation is executed, which may be performed after both synchronization operations are complete.

Figure 6:
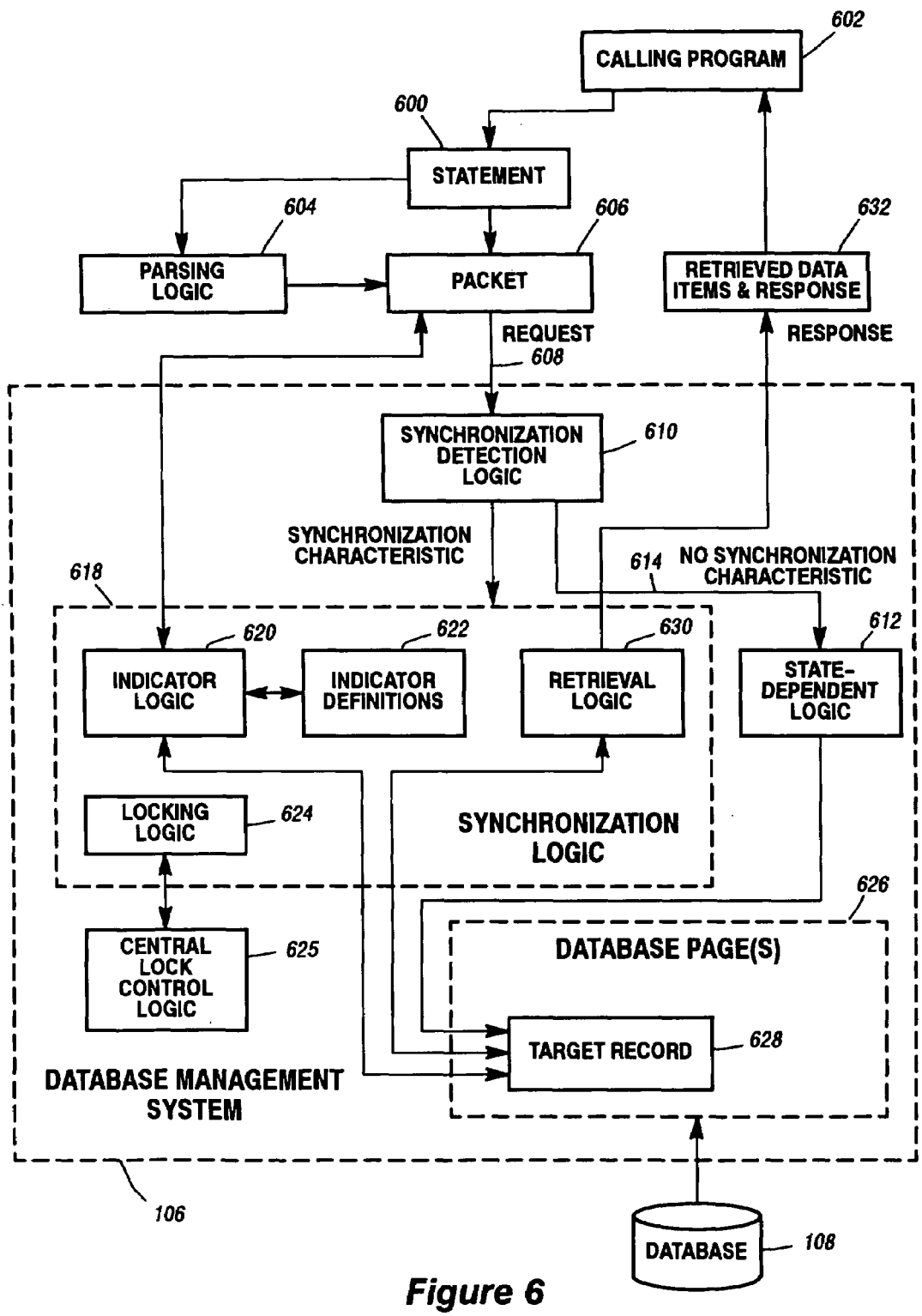
FIG. 6 is a system block diagram of the logic functions provided by one embodiment.

FIG. 6 is a system block diagram that conceptualizes the various logic functions provided by another embodiment of the inventive system and method. Any of these logic functions may be implemented in hardware, software, firmware, any other programmable logic, or any combination thereof.

According to the system and method, a statement 600 appears in the instruction sequence of calling program 602. This statement may be of an update-, insert-, synchronize-, or another similar type statement that may initiate the synchronization operation. Parsing logic 604 utilizes the statement and the accompanying data to create packet 606. The creation of this packet results in issuance of a request to database management system 106, as indicated by line 608.

When the request is received, it is routed to synchronization detection logic 610 to determine whether the request is associated with a synchronization characteristic. In one embodiment, this characteristic will be reflected by the activation of a synchronization flag within packet 606. If the request is not associated with this characteristic, the request is forwarded to state-dependent logic 612, as shown by arrow 614. The state-dependent logic requires the state of the database to be determined prior to initiating an operation that will complete the statement. Thus, if the synchronization characteristic is not activated, the state-dependant logic initiates execution of a first statement to determine the initial state of the database. Next, this logic initiates execution of a second statement based on the determined state of the database. This state-dependent logic is adapted to execute prior art update- and insert-type statements.

In cases involving a synchronization operation, the synchronization characteristic will be associated with the request. In this case, synchronization detection logic 610 enables use of the synchronization logic 618. The request is forwarded to synchronization logic 618, which will execute a single statement that performs an atomic operation to transform a table of database 108 from a first unknown state to a second selected state. The selected state will include a record that is identified within command packet 606, and that may store one or more data values identified in command packet 606.

Synchronization logic 618 includes several logic groups, including indicator logic 620. Indicator logic interprets indicator values that are identified within the command packet 606. These indicator values are identified either by specifying names of variables that store the indicator values, or by providing the values themselves within the command packets. Indicator logic 620 interprets these indicator values based on indicator definitions 622, which may be included in a table or some other data structure that correlates predefined values with some type of action (e.g., "update using provided data", "update using default value", "existing contents remain unchanged"). In another embodiment, the actions to be taken based on the indicator values are hard-coded within indicator logic 620. In any event, indicator logic 620 uses these values to determine which one or more columns of the identified record, if any, are to be updated or created to include data provided in command packet 606. In one embodiment, indicator logic interprets these values based on the initial state of the database (e.g., whether the target record already exists in the database). As stated above, this information is not known prior to execution of the synchronization operation.

In one embodiment, the synchronization operation operates on a stored copy of one or more pages 626 of the identified database table. These pages may be retrieved from database 108 and stored within local storage, which may be an in-memory cache 107 (FIG. 1). These pages are searched to locate an insertion point for the identified record. This will be the point at which the record identified by the command packet 606 already resides, or alternatively, the point that record will be inserted into the table.

Once the insertion point is located, locking logic 624 requests activation of a required lock. In the current embodiment, locking logic 624 requests activation of a WRITE lock on the one of pages 626 that contains the insertion point. This WRITE lock will be granted by central lock control logic 625, which manages the locking of pages for database management system 108. This WRITE lock is activated during synchronization without first determining whether the identified record exists.

Next, indicator logic 620 interprets indicator values in the above-described manner to determine how to create or update target record 628 using data values containing, or otherwise identified, in command packet 606. The indicator values are further used by retrieval logic 630 to determine whether any of the columns of the target record are to be retrieved for return to calling program 602. If so, the contents of these columns are provided to the calling program as the retrieved data values (data items) along with a response 632 indicating that the synchronization operation has been completed. Sometime thereafter, a COMMIT operation will be executed by the calling program to commit the updated state of page(s) 626 to the database 108 such that a persistent copy is created. Thereafter, locking logic 624 will request the deactivation of the WRITE lock on the database page(s) 626.

The above described synchronization operation may be adapted for use in any database environment, and is not restricted for use in a database implemented using the SQL language. Moreover, as described above, it may be invoked using an existing statement. For example, the above discussion describes the use of an existing UPDATE statement that is used in conjunction with a new SYNCHRONIZE keyword that triggers synchronization processing. This results in a single statement (i.e., UPDATE statement with SYNCHRONIZE keyword) that initiates the synchronization operation. A similar approach uses an existing INSERT statement in conjunction with the SYNCHRONIZE keyword. Still another embodiment provides an entirely new SYNCHRONIZE statement to trigger the synchronization operation. All of these embodiments utilize a single statement to cause the transformation of the database from a first unknown state to a second known state. Thus, while various embodiments of the present invention have been described above, it should be understood that they have been presented by way of example only, and not as a limitation. The breadth and scope of the present invention should not be limited by any of the above-described exemplary embodiments, but should be defined only in accordance with the following Claims and their equivalents.

What is claimed is:

1. An automated method of managing a database, comprising:
    providing by a calling program one or more data values for inclusion in an identified target record;
    invoking a single call by the calling program to a database management system (DBMS) to transform the database from a first unknown state to a second state that includes the target record which is storing at least one of the one or more data values, wherein the invoking the single call is performed without the calling program first determining whether the target record exists in the database;
    wherein the single call by the calling program specifies to the DBMS a respective indicator value for one or more of the data values, each respective indicator value indicating whether or not an associated data value in the single call is used to update the target record by the database management system;
    determining by the DBMS, in response to the invoking the single call, whether the target record exists within the database;
    in response to the target record existing in the database, updating the target record by the DBMS to store the at least one of the one or more data values, and in response to the target record un-existing in the database creating the target record in the database to store the at least one of the one or more data values, updating the target record with the associated data value for each indicator value indicating update, and un-updating the target record with the associated data value for each indicator value indicating no update;
    wherein the database includes multiple pages, and wherein the invoking step includes:
        activating a write lock on one of the pages containing an insertion point for the target record;
        determining whether the page stores the target record;
        transforming the database to the second state;
        committing changes made to the database; and
        deactivating the write lock.

2. The method of claim 1, and further including providing the data values in a format that is independent of whether the target record exists within the database prior to invoking the call to the database management system.

3. The method of claim 1, and further including retrieving one or more data values from the target record for return to the user.

4. The method claim 1, and further including retrieving one or more data values from the target record for return to the user based on the state of one or more indicator values.

5. The method of claim 4, wherein the retrieving of the one or more data values from the target record is based on the collective state of all of the one or more indicator values.

6. The method of claim 1, and further including determining whether a synchronization attribute associated with the call is activated, and if so, performing the invoking step, and if not, requiring the first state of the database is determined prior to initiating another call to the database management system to perform one of a record creation operation or a record modification operation.

7. A data processing system, comprising:
    a processor;
    a database to store tables containing records; and
    a database management system (DBMS) coupled to the database and executable on the processor, wherein the DBMS includes synchronization logic to execute a single statement in response to a request from a calling program, wherein the DBMS places an identified one of the tables in a selected state that includes an identified record storing one or more data values irrespective of whether the identified record existed prior to execution of the single statement, and the request from the calling program is made without the calling program first determining whether the identified record exists in the database;
    wherein the request from the calling program specifies to the DBMS a respective indicator value for at least one of the data values, each respective indicator value indicating whether or not an associated data value in the request is used to update the identified record by the database management system;
    wherein the DBMS further includes,
        synchronization detection logic communicatively coupled to the synchronization logic to determine whether a synchronization characteristic of the request is activated, and if so to enable use of the synchronization logic;
        wherein the synchronization logic includes indicator logic configured to determine which one or more columns of the identified record are updated based on each respective indicator value specified in the request;
        wherein the DBMS, responsive to the indicator logic, updates each one or more columns in the identified record with the associated data value for each indicator value indicating update, and does not update each one or more columns in the identified record with the associated data value for each indicator value indicating no update; and
        state-dependant logic communicatively coupled to the synchronization detection logic, whereby if the synchronization characteristic is un-activated, the state-dependant logic determines the initial state of the database and initiates an appropriate operation based on the initial state; and
    wherein the database includes multiple pages, and wherein the invoking step includes:
        activating a write lock on one of the pages containing an insertion point for the target record;
        determining whether the page stores the target record;
        transforming the database to the second state;

committing changes made to the database; and
deactivating the write lock.

8. The system of claim 7, wherein the indicator logic is further configured to determine which one or more columns of the identified record are updated further based on whether the identified record exists prior to execution of the statement.

9. The system of claim 7, wherein the synchronization logic includes locking logic to activate a write lock on a page of the identified table that contains an insertion point for the identified record, the write lock being activated without first determining whether the identified record exists.

10. The system of claim 7, wherein the synchronization logic includes retrieval logic to retrieve one or more data values from the identified record.

11. A computer readable storage medium storage medium having computer program instructions embodied therein, said computer program instructions when executed by a processor cause a computer to perform a method, comprising:
receiving a request by a calling program specifying a database table, a record, and one or more data values; and
executing a single call by the calling program to a database management system (DBMS) to cause the database table to transition from an unknown initial state to a known state that includes the record storing at least one of the data values, wherein the single call is executed without the calling program first determining whether the record exists in the database;
wherein the single call by the calling program specifies to the DBMS a respective indicator value for one or more of the data values, each respective indicator value indicating whether or not an associated data value in the single call is used to update the target record by the database management system;
determining by the DBMS, in response to executing the single call, whether the record exists within the database; and
in response to the record existing in the database, updating the record by the DBMS to store the at least one of the one or more data values, and in response to the target record un-existing in the database creating the record in the database to store the at least one of the one or more data values, updating the target record with the associated data value for each indicator value indicating update, and un-updating the target record with the associated data value for each indicator value indicating no update,
wherein the executing step includes:
locating a page of the database table that includes an insertion point for the record;
activating a write lock on the page without ascertaining the initial state;
causing the transition to the known state; and
deactivating the write lock after a commit operation is completed to make the known state persistent.

12. The computer readable storage medium of claim 11, wherein the method includes:
locating a page of the database table that includes an insertion point for the record;
activating a write lock on the page without ascertaining the initial state;
retrieving the contents of one or more columns of the record based on indicator values provided with the one or more data values; and
deactivating the write lock after a commit operation is completed to make the known state persistent.

* * * * *